United States Patent [19]
Houweling

[11] Patent Number: 5,409,510
[45] Date of Patent: Apr. 25, 1995

[54] WATERING GUTTER

[75] Inventor: Paul Houweling, British Columbia, Canada

[73] Assignee: Houweling Nurseries Ltd., Langley, Canada

[21] Appl. No.: 221,635

[22] Filed: Mar. 30, 1994

Related U.S. Application Data

[63] Continuation of Ser. No. 915,522, Jul. 20, 1992, abandoned.

[51] Int. Cl.$^6$ ............................................. A01G 31/00
[52] U.S. Cl. .......................................... 47/58; 47/62; 47/39
[58] Field of Search ................ 47/62, 62 C, 18; 52/630

[56] References Cited

U.S. PATENT DOCUMENTS

| | | |
|---|---|---|
| 3,451,162 | 6/1969 | Rasmussen . |
| 3,603,034 | 9/1971 | Maxwell-Stewart . |
| 3,842,534 | 10/1974 | Walters ............................. 47/18 R |
| 4,089,145 | 5/1978 | DeVries ............................. 52/630 |
| 4,324,069 | 4/1982 | Flagg ................................. 47/62 |
| 4,334,389 | 6/1982 | Burcombe ......................... 47/62 |
| 4,347,687 | 9/1982 | Sibbel . |
| 4,514,929 | 5/1985 | Lestraden ......................... 47/18 R |
| 4,833,825 | 3/1989 | Sprung . |
| 4,887,388 | 12/1989 | Waltel . |

FOREIGN PATENT DOCUMENTS

| | | | |
|---|---|---|---|
| 2546031 | 11/1984 | France ............................. 47/18 |
| 2829243 | 1/1979 | Germany ......................... 47/18 |
| 2812324 | 9/1979 | Germany ......................... 47/18 |
| 3619953 | 12/1986 | Germany ......................... 47/18 |
| 2230170 | 10/1990 | United Kingdom .............. 47/62 C |
| 1537188 | 1/1990 | U.S.S.R. .......................... 47/62 |

OTHER PUBLICATIONS

Bowman Construction Products pp. 1, 2, 18 date Apr. 29, 1975.

*Primary Examiner*—Henry E. Raduazo
*Attorney, Agent, or Firm*—Murray E. Thrift; Adrian D. Battison; Stanley G. Ade

[57] ABSTRACT

A watering gutter for use in a flood irrigation system is an elongate channel with spaced side walls and two container supporting surfaces running along the bag. The container supporting surfaces are separated by a drainage trough. Two additional drainage troughs are located between the side walls and the container supporting surfaces. In use, the gutters are arranged side by side, but spaced apart to provide adequate air movement around the plants. The troughs in the base of each gutter ensure uniform water distribution to plants and full drainage of the water away from the plant containers.

6 Claims, 2 Drawing Sheets

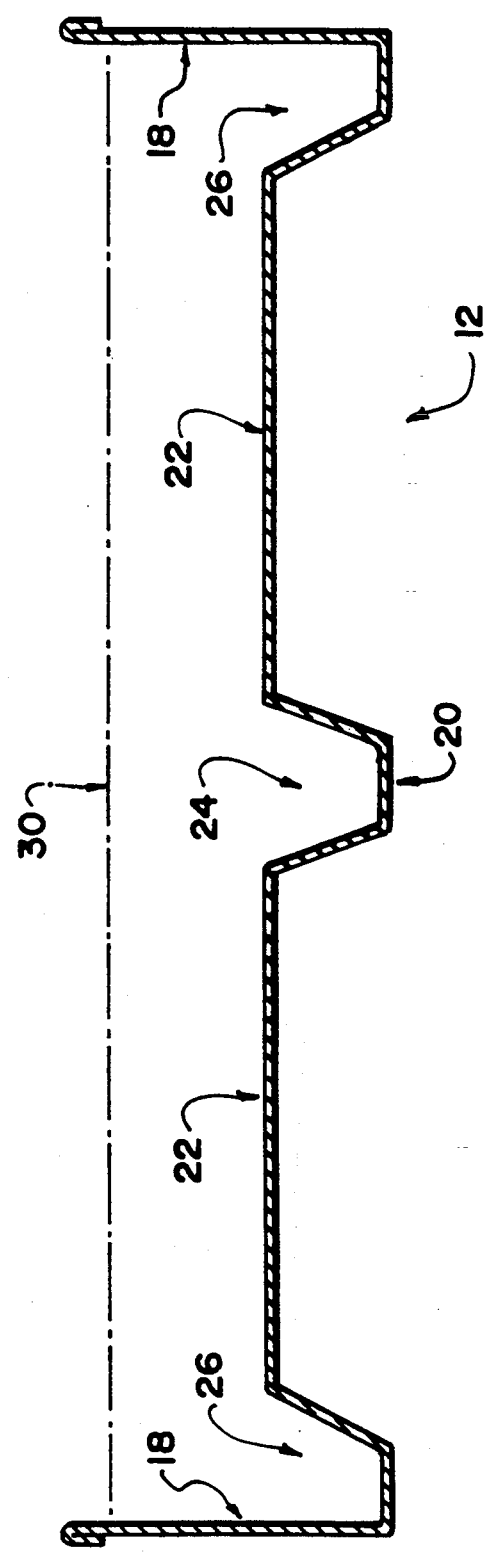

WATERING GUTTER

This application is a continuation of application Ser. No. 07/915,522, filed Jul. 20, 1992, abandoned.

FIELD OF THE INVENTION

The present invention relates to apparatus useful in the flood irrigation of container grown plants.

BACKGROUND

In flood irrigation, plants are periodically watered by flooding the soil or other medium in which they are planted with a large quantity of water. The water is then drained so that the only water remaining in the soil is that absorbed in the soil. The present invention is concerned with a novel watering gutter and gutter system for this purpose.

SUMMARY

According to the present invention there is provided, for use in a flood irrigation system, a watering gutter comprising an elongate channel having side walls, a base with container supporting means therealong, and drainage troughs along the base, adjacent and below the container supporting means.

The gutter thus may support a row or rows of plants along the gutter. During flooding, water is added to the gutter to saturate the soil in the plant containers. When draining, the troughs in the bottom of the gutter ensure that no water is left in contact with the containers.

Preferably, there are two container supporting surfaces running the length of the gutter. These are separated by a centre drainage trough with two other troughs along the side walls. The three troughs provide for even water distribution when flooding as well as for drainage. The gutter is preferably at least 12¼ inches between the side walls, which will accommodate most industry containers. The troughs are preferably about 1 inch in height. The preferred gutter is roll formed of steel or aluminum sheet.

In a flood irrigation system using the gutters, the gutters are spaced apart to provide gaps between the gutters. The gaps allow air flow needed to reduce humidity around the plants, which helps keep the plants growing.

BRIEF DESCRIPTION OF THE DRAWINGS

In the accompanying drawings, which illustrate an exemplary embodiment of the present invention:

FIG. 2 is a transverse cross section of an exemplary gutter.

DETAILED DESCRIPTION

Figure 1:
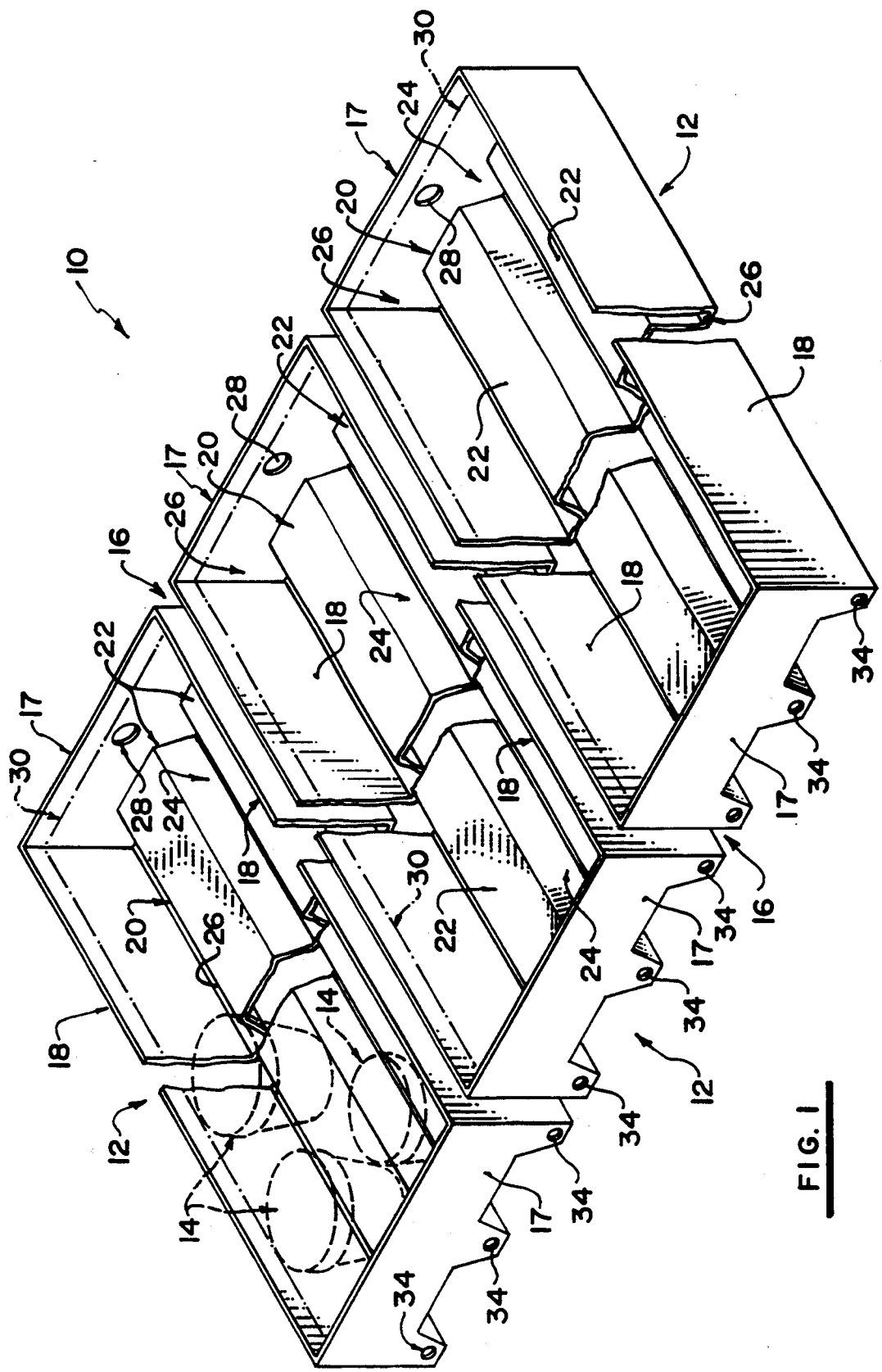
FIG. 1 is an isometric view of a system using the gutters.

Referring to the accompanying drawings, FIG. 1 illustrates an irrigation system 10 including a set of gutters 12 that are arranged parallel to one another. Each gutter supports a series of plant containers 14. Gaps 16 between the gutters allow for air flow around the plants to reduce humidity levels.

Each gutter 12 is a roll formed metal section with end walls 17. The gutter has a channel-shaped profile with two side walls 18 and base 20. The side walls are approximately 2¼ inches in height and are spaced by a distance not less than 2¼ inches. The base is formed with two raised container support surfaces 22. Each of these is approximately 4¼ inches in width. They are separated by a centre trough 24 of approximately 1½ inch width and 1 inch height. The trough tapers downwardly to a width of approximately ¾ inch.

Two edge troughs 26 extend along the side walls 18, between the side walls and the container supporting surfaces. These, like the centre trough have a depth of about 1 inch.

Each gutter has a water inlet 28 that allows water to be introduced to the gutter to fill the gutter up to a level 30 that will provide water to the plants in containers 32. The gutter has a drain 34 to drain water from each of the troughs 24 and 26 to ensure that there is no water remaining in contact with the containers of plants.

The gutter of the present invention can be manufactured relatively inexpensively indefinite lengths. Because it is elongate and relatively narrow, the gutters can be arranged side by side with adequate gaps between them to provide for the desired air flow around the plants.

While one embodiment of the present invention has been described in the foregoing, it is to be understood that other embodiments are possible within the scope of the invention and are intended to be included within the scope of the appended claims.

I claim:

1. A method of flood irrigation comprising:
providing a watering gutter by roll forming a single sheet of metal to form an elongate channel having a substantially greater length than width, the channel consisting of two side walls, a base with two raised container supporting surfaces extending therealong, two edge drainage troughs along the base, between the respective side walls and the adjacent container supporting surfaces and a single centre drainage trough along the base, between the container supporting surfaces, the gutter being arranged substantially horizontally with the drainage troughs below the container supporting surfaces;

closing opposite ends of the channel;

providing means for supplying water to the gutter for filling the channel with water to a level above the container supporting surfaces;

providing means for draining water from all of the drainage troughs of the gutter; and periodically filling the channel with water to said level above the container supporting surfaces and subsequently draining the water from the channel to a level below the container supporting surfaces.

2. A method according to claim 1, comprising forming the gutter with a width of from 8 to 18 inches between the side walls.

3. A method according to claim 2, comprising forming each drainage trough with a depth of substantially one inch.

4. A method of flood irrigation for plants in containers, said method comprising;
providing a plurality of elongate watering gutters by roll forming each gutter from a single sheet of metal to form an elongate channel consisting of two side walls, a base having two raised container supporting surfaces therealong two edge drainage troughs along the base, between the respective side walls and the adjacent container supporting surfaces and a single centre drainage trough along the base, between the container supporting surfaces;

arranging the gutters substantially horizontally with the drainage troughs being below the container supporting surfaces and with the gutters substantially parallel and spaced apart with air gaps between adjacent gutters;

providing means closing opposite ends of each channel;

providing means for supplying water to each gutter for filling the channel with water to a level above the container supporting surfaces; providing means for draining water from all of the drainage troughs of each gutter; and periodically filling the channel with water to said level above the container supporting surfaces and subsequently draining the water from the channel to a level below the container supporting surfaces.

5. A method according to claim 4 comprising forming each gutter with a width of between 8 and 18 inches between the side walls.

6. A method according to claim 5 comprising forming each drainage trough with a depth of substantially one inch.

* * * * *